US008887828B2

(12) United States Patent
Dillman et al.

(10) Patent No.: US 8,887,828 B2
(45) Date of Patent: Nov. 18, 2014

(54) REMOTELY ADJUSTABLE FEED SYSTEM (75) Inventors: John W. Dillman, Newberg, OR (US); Garrett L. Headrick, Newberg, OR (US); David M. Briggs, Newberg, OR (US); Timothy S. Clements, McMinnville, OR (US); Darren P. Weidman, Portland, OR (US); Dominic M. Bertram, Beaverton, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 982 days.

(21) Appl. No.: 13/005,313

(22) Filed: Jan. 12, 2011

(65) Prior Publication Data

US 2012/0175143 A1 Jul. 12, 2012

(51) Int. Cl.
*B23Q 5/26* (2006.01)
*E21B 3/00* (2006.01)
*B23Q 1/26* (2006.01)

(52) U.S. Cl.
CPC . *B23Q 1/262* (2013.01); *E21B 3/00* (2013.01); *B23Q 5/26* (2013.01)
USPC ............................. 173/90; 173/104; 173/200

(58) Field of Classification Search
CPC .......................................................... E21B 3/00
USPC ................................. 173/90, 104, 200; 74/25
See application file for complete search history.

(56) References Cited

U.S. PATENT DOCUMENTS 1,896,752 A * 2/1933 Raule ................................ 74/57
2009/0324350 A1 12/2009 Clements et al.

* cited by examiner

*Primary Examiner* — Michelle Lopez
(74) *Attorney, Agent, or Firm* — DASCENZO Intellectual Property Law. P.C.

(57) ABSTRACT

Various embodiments herein provide a remotely adjustable feed system for remotely controlling the movement of a tool head on a machining tool along an axis of motion by means of converting reciprocal linear motion, i.e., back and forth linear motion, into rotary motion. The rate of movement of the tool head along the axis of motion may be controlled by varying the distance of linear motion in each cycle of linear reciprocal motion and/or by varying the rate of linear reciprocal motion cycles per unit time. Alternatively, or in addition, the rate of movement of the tool head along the axis of motion may be controlled by varying the amount of rotary motion that results from a given amount of reciprocal linear motion. Additionally, in some embodiments, the movement of the tool head may be controlled by directly controlling the rotary motion that drives the tool head along the axis of motion. The rotary motion may be controlled by adjusting the speed of continuous rotation and/or adjusting the frequency of pulsed rotations.

28 Claims, 9 Drawing Sheets

REMOTELY ADJUSTABLE FEED SYSTEM

TECHNICAL FIELD

Embodiments herein relate to the field of processing machinery, and, more specifically, to machines adapted to remotely adjust the feed of a machining tool head in processing machinery.

BACKGROUND

Portable machining tools, such as flange facers, milling tools, boring bars, and valve machines, etc., often have a tool head that can be fed, i.e., moved, along a tool arm, down a bar, or along a slide bed. However, portable machining tools typically require manual adjustment in close proximity to the tool head in order to achieve the desired feed. This manual feed can be imprecise and often dangerous, especially during operation of the machining tool.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for remotely adjusting the feed of a tool head on a machining tool are provided. In exemplary embodiments, a computing device may be endowed with one or more components of the disclosed apparatuses and/or systems and may be employed to perform one or more methods as disclosed herein.

Various embodiments generally provide a remotely adjustable feed system for remotely controlling the movement of a tool head on a machining tool along an axis of motion by means of converting reciprocal linear motion, i.e., back and forth linear motion, into rotary motion. The rate of movement of the tool head along the axis of motion may be controlled by varying the distance of linear motion in each cycle of linear reciprocal motion and/or by varying the rate of linear reciprocal motion cycles per unit time. Alternatively, or in addition, the rate of movement of the tool head along the axis of motion may be controlled by varying the amount of rotary motion that results from a given amount of reciprocal linear motion. Additionally, in some embodiments, the movement of the tool head may be controlled by directly controlling the rotary motion that drives the tool head along the axis of motion. The rotary motion may be controlled by adjusting the speed of continuous rotation and/or adjusting the frequency of pulsed rotations.

In various embodiments, the remotely adjustable feed system may generally include an actuator coupled to a ratchet arm of a rotary clutch and a remote controller capable of controlling the amount and/or rate of back and forth linear motion of the actuator. The rotary clutch may be adapted to turn a lead screw in one rotary direction in response to the back and forth motion of the ratchet arm. That is, when the actuator moves in a forward direction and pushes the ratchet arm, the rotary clutch may rotate the lead screw in a first rotary direction. However, when the actuator moves in a backward direction and pulls the ratchet arm back, the rotary clutch may not rotate the lead screw in either direction. The remotely adjustable feed system may further include a tool head coupled to the lead screw, such that the rotary motion of the lead screw adjusts the feed, i.e., linear motion, of the tool head. As the actuator moves linearly back and forth, the actuator may engage the ratchet arm, causing the rotary clutch to rotate the lead screw. As the lead screw rotates, the tool head is moved with respect to the lead screw in a first axis of motion parallel to the axis of the lead screw. In other embodiments, the remotely adjustable feed system may not include an actuator, and the rotation of the lead screw may be controlled directly by a motor.

For purposes of describing embodiments herein, remote controller refers to a control mechanism that may be used at some distance from the machine the remote controller controls. The remote controller may or may not be physically attached to the machine, e.g., wired to the machine. In some embodiments, the remote controller may communicate wirelessly with the machine.

In various embodiments, the remote controller may control the rate of feed of the tool head by adjusting the distance the actuator strokes back and forth and/or the number of times the actuator strokes per unit time. In some embodiments, the actuator may be configured to stroke a set stroke distance at a set interval if unimpeded. In these embodiments, the remotely adjustable feed system may include a stop that is movable in the linear path of the actuator. The stop may prevent the actuator from stroking past the position of the stop on the linear path. The remote controller may be configured to control the position of the stop within the linear path of the actuator. In some embodiments, when the remote controller is in the off position, the stop may not allow the actuator to stroke at all, and thus the tool head will not move. As the remote controller moves the stop away from the actuator, the actuator may be allowed to stroke further, which ratchets the ratchet clutch, thereby rotating the lead screw and moving the tool head down the lead screw.

In other embodiments, the remotely adjustable feed system may not include a stop. In these embodiments, the remote controller may directly control how often and/or how far the actuator strokes. As the actuator strokes more often and/or farther, the rate that the tool head moves down the lead screw increases.

In yet other embodiments, the rotation of the lead screw may be controlled directly. For example, the remotely adjustable feed system may include a motor coupled to the lead screw such that the motor rotates the lead screw. The remote controller may be configured to control the rotation of the motor, thereby controlling the rotation of the lead screw. In some embodiments, the motor may be configured to rotate continuously and the remote controller may be configured to adjust the speed of the rotation. In other embodiments, the motor may be configured to pulse a fixed distance and speed and the remote controller may be configured to adjust the frequency of the pulses. In some embodiments, the remote controller may be configured to operate wirelessly. In such embodiments, the remote controller may include a transmitter and the motor may be coupled to a receiver. In some embodiments, the receiver may also send information back to the remote controller. In other embodiments, the remote controller may be hard-wired to the motor. In embodiments where the tool arm rotates during operation, the remote controller may be wired to the motor through a slip ring.

In various embodiments, the actuator and ratchet clutch may be contained in a feed box. The feed box may be mounted on the machining tool, such as on the tool arm, so that the ratchet clutch may engage the lead screw. In some embodiments, the feed box may be mounted to the machining tool in a removable fashion, such as with screws and/or any other suitable interface.

In some embodiments, the feed box may be designed to turn the feed shaft in only one direction relative to the feed box. Since such a design would not include a transmission or other mechanism for remotely controlling the rotation of the feed shaft in both directions, it may dramatically simplify the design of the feed box. However, the direction of feed of the tool head may still be reversed by reversing the orientation with which the feed box is mounted to the machining tool. For example, the feed box may have a front face and a rear face, either of which may be mounted to a feed box interface of the machining tool. When the front face of the feed box is mounted to the feed box interface, the feed box may move the tool head in a first direction, away from the feed box, along the lead screw. However, when the rear face of the feed box is mounted to the feed box interface, the feed box may move the tool head in a second direction, toward the feed box, along the lead screw. Thus, the operator may configure the remotely adjustable feed system to remotely adjust the feed of the tool head in either the first direction or the second direction along the lead screw.

In some embodiments, the feed box may further include a removable feed shaft to facilitate reversing the orientation of the feed box and/or allow manual adjustment of the feed in either the first direction or the second direction. The feed shaft may be coupled between the ratchet clutch and the lead screw such that the ratchet clutch turns the feed shaft as the actuator ratchets the ratchet clutch, and the feed shaft turns the lead screw. For example, the ratchet clutch may include a bushing having notches at one or both ends of the bushing and the feed shaft may include a pin extending radially from the feed shaft to engage the notches of the bushing. As the actuator pushes the ratchet arm back and forth, the ratchet clutch turns the bushing in one radial direction, which also turns the feed shaft in the same direction. At least one end of the feed shaft may be adapted to engage the lead screw, such as with a male/female hex interface, such that the feed shaft turns the lead screw as the bushing turns the feed shaft. To reverse the direction of the feed, the feed shaft may be removed from the bushing, the orientation of the feed box may be reversed, and then the feed shaft may be reinserted to engage the lead screw.

In some embodiments, the feed shaft may be designed to allow for manual adjustment of the tool head in both directions along the lead screw. The end of the feed shaft opposite the lead screw may be configured to allow manually turning the feed shaft, such as with a male/female hex interface. In some embodiments, the feed shaft may be designed such that the feed shaft can be disengaged from the bushing while remaining engaged to the lead screw. Using the example bushing and feed shaft described above to illustrate, the feed shaft may be removed from the bushing enough that the pin of the feed shaft no longer sits between the notches of the bushing, but the female hex end of the feed shaft may still engage the male hex end of the lead screw. As such, the operator may manually turn the feed shaft which will rotate the lead screw and move the tool head. Since the feed box is no longer restricting the rotation in one direction, the feed shaft may be manually rotated in either direction. Therefore, the tool head can be moved in either direction along the lead screw, regardless of the orientation of the feed box.

In various embodiments, the remotely adjustable feed system may include a plurality of mounting interfaces to which the feed box may be mounted. Each mounting interface may include a lead screw that may be engaged by the feed box when the feed box is mounted. Different mounting interfaces may allow feed of different tool heads and/or feed of the same tool head in different axes of motion. For example, in some embodiments, the remotely adjustable feed system may include a first mounting interface on the tool arm for adjusting the feed of the tool head along a first axis of motion parallel to the axis of the tool arm, and a second mounting interface on the tool head assembly, for adjusting the feed of the tool head in a second axis of motion. In some embodiments, the second axis of motion may be perpendicular to the first axis of motion. In some embodiments, the tool head may be configured to rotate with respect to the tool arm, such that the tool head may be secured to the tool arm at any angle. As such, the operator may adjust the angle of the tool head to allow remotely adjusting the feed along a second axis of motion having any angle with the tool arm.

The remotely adjustable feed system may be suited for use in any machine where it is desired to remotely control the linear motion of a component along a component arm, such as adjusting the feed of a tool head in a processing machine. For example, the tool head may include a flange facer, milling tool, boring bar, lathe, valve machine, etc.

In various embodiments, the amount and/or rate of linear motion of the actuator may be controlled by any suitable means, such as pneumatically, hydraulically, electronically, magnetically, or any combination of pneumatic, hydraulic, electronic, and/or magnetic based controls. Furthermore, the remote controller may operate wirelessly, or may be wired or otherwise physically connected to the actuator. In some embodiments, the remote controller may control the amount and/or rate of linear motion of the actuator directly. In other embodiments, the remote controller may control the amount and/or rate of linear motion of the actuator by controlling the position of the stop, as discussed above.

Various embodiments of a pneumatically-controlled remotely adjustable feed system may include an unregulated air supply (e.g., an air supply that may be turned on or off only) and a regulated air supply (e.g., an air supply where the pressure may be varied). Both the unregulated air supply and the regulated air supply may be generated from a main air source. The remote controller of the pneumatically-controlled remotely adjustable feed system may include a valve for turning the unregulated air supply on and off, such as a ball valve, and a regulator for varying the pressure in the regulated air supply. The unregulated air supply may be converted to a pulsed air supply, such that when the unregulated air supply is turned on, the pulsed air supply pulses on and off continuously. For example, the unregulated air supply may be run through a trip valve including a notched cam to create the pulsed air supply. The pulsed air supply may then be input to the feed box to cause the actuator to stroke back and forth. The regulated air supply may be input to the feed box to allow control of the stop and thus control over how far the actuator may stroke with each pulse.

For example, the actuator may be a spring-loaded cylinder in a shaft, and the pulsed air supply may be input on the shaft side of the cylinder. When the pulsed air supply is pulsing air, the air pressure overcomes the force of the spring and retracts the cylinder of the actuator. When the pulse of air stops, the spring drives the cylinder forward. Similarly, the stop may be a spring-loaded cylinder in a shaft, and the regulated air supply may be input on the shaft side of the cylinder. When the regulated air supply is off, the stop may extend into the path of the actuator and prevent the actuator from stroking. As the pressure in the regulated air supply is turned on and increased, the pressure may overcome the force of the spring and cause the stop to retract, which allows the actuator to stroke further. As the actuator strokes, it pushes the ratchet arm of the ratchet clutch, rotating the lead screw and feeding the tool head along the axis of the lead screw, as explained above. By increasing the air pressure in the regulated air supply, the operator can increase the rate of feed of the tool head.

In some embodiments, the remotely adjustable feed system may operate hydraulically. Embodiments using hydraulic controls may be substantially similar to the embodiments described for pneumatic controls, but may use hydraulic controls instead of pneumatic controls.

In other embodiments, the remotely adjustable feed system may include electronic controls. In some such embodiments, the actuator may be driven by an on-board battery and servo motor. In other embodiments, the actuator may be driven through a slip ring and a motor with one or more solenoids. In electronic based embodiments of the remotely adjustable feed system, the remote controller may directly control the frequency with which the actuator strokes and/or the distance the actuator travels with each stroke. As such, a stop may not be required to control the movement of the actuator.

In other embodiments, the rotation of the lead screw may be controlled directly. For example, the lead screw may be operatively coupled to a motor and the rotation of the motor may be controlled by the remote controller. In these embodiments, the remotely adjustable feed system may not include a reciprocal motion actuator. In some embodiments, the motor may be configured to rotate continuously and the remote controller may be configured to adjust the speed of the rotation. In other embodiments, the motor may be configured to pulse a fixed distance and speed, and the remote controller may be configured to adjust the frequency of the pulses. In some embodiments, the remote controller may be configured to operate wirelessly. In such embodiments, the remote controller may include a transmitter and the motor may be coupled to a receiver. In some embodiments, the receiver may also send information back to the remote controller. In other embodiments, the remote controller may be hard-wired to the motor. In embodiments where the tool arm rotates during operation, the remote controller may be wired to the motor through a slip ring.

Figure 1A:
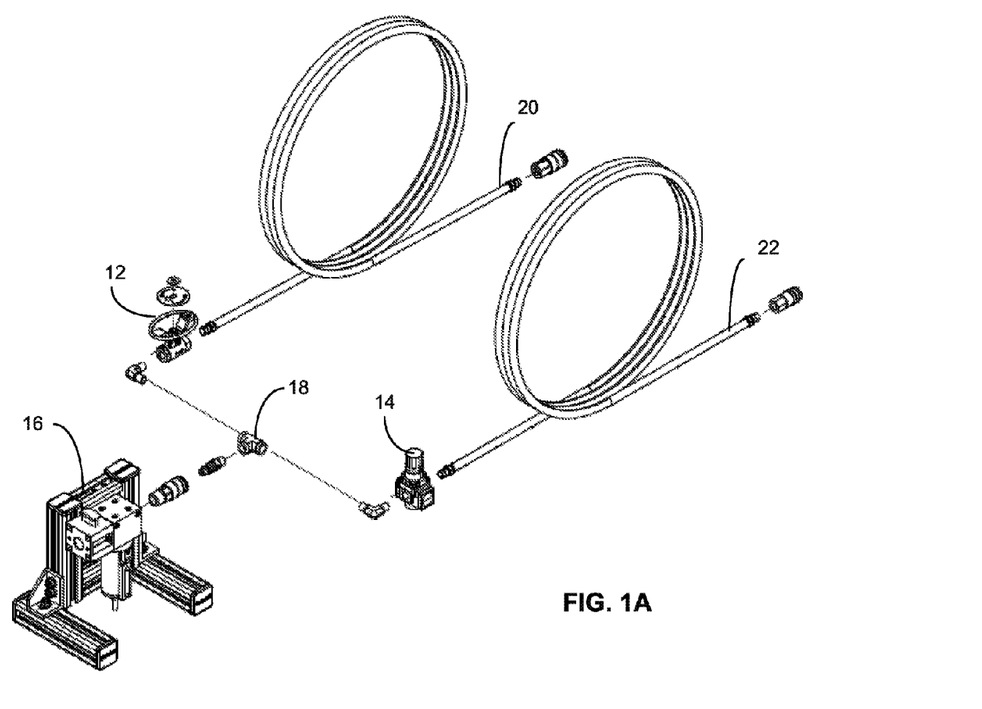
FIG. 1A illustrates an exploded view of a remote controller in accordance with various embodiments.
Figure 1B:
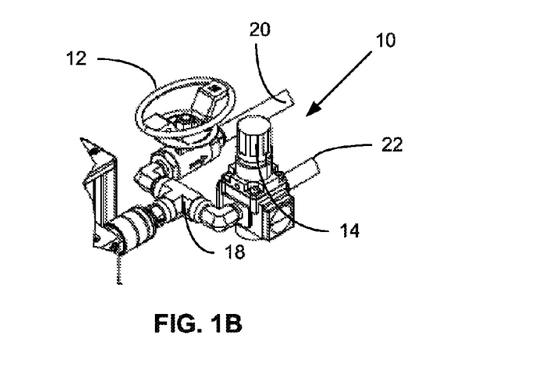
FIG. 1B illustrates a perspective view of a remote controller in accordance with various embodiments.

FIGS. 1A-5 illustrate an example of a remotely adjustable feed system with pneumatic control, in accordance with various embodiments. FIG. 1A illustrates an exploded view of the controls and FIG. 1B illustrates a perspective view of a remote controller 10 including a ball valve 12 and a regulator 14. Ball valve 12 and regulator 14 may be coupled to a main air source 16 by a tee fitting 18, allowing both ball valve 12 and regulator 14 to use the same air source 16. Ball valve 12 may be turned on or off to create unregulated air supply 20, while regulator 14 may be adjusted to supply a regulated air supply 22 with controlled pressure. As will be explained more fully below, the feed of the remotely adjustable feed system may be turned on by turning ball valve 12 to the on position and the rate of feed may be adjusted by turning regulator 14 to adjust the air pressure in regulated air supply 22. When regulator 14 is in the off position, the feed is set to zero and the tool head is not being moved, which provides an added safety feature in the event of pressure loss. When regulator 14 is turned on, the rate of feed of the tool head increases as the pressure in regulated air supply 22 increases.

Figure 2:
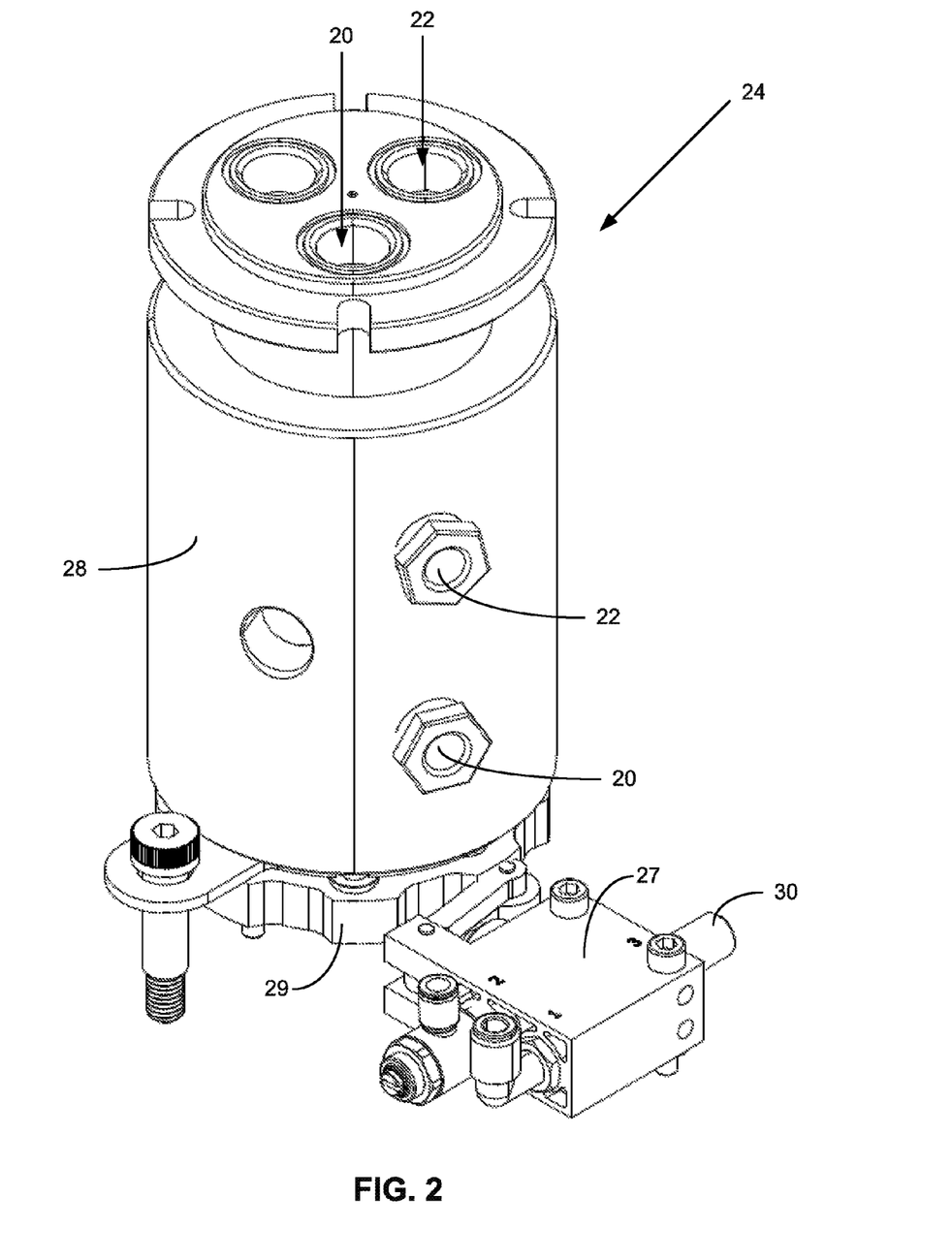
FIG. 2 illustrates a perspective view of a rotary union in accordance with various embodiments.
Figure 3A:
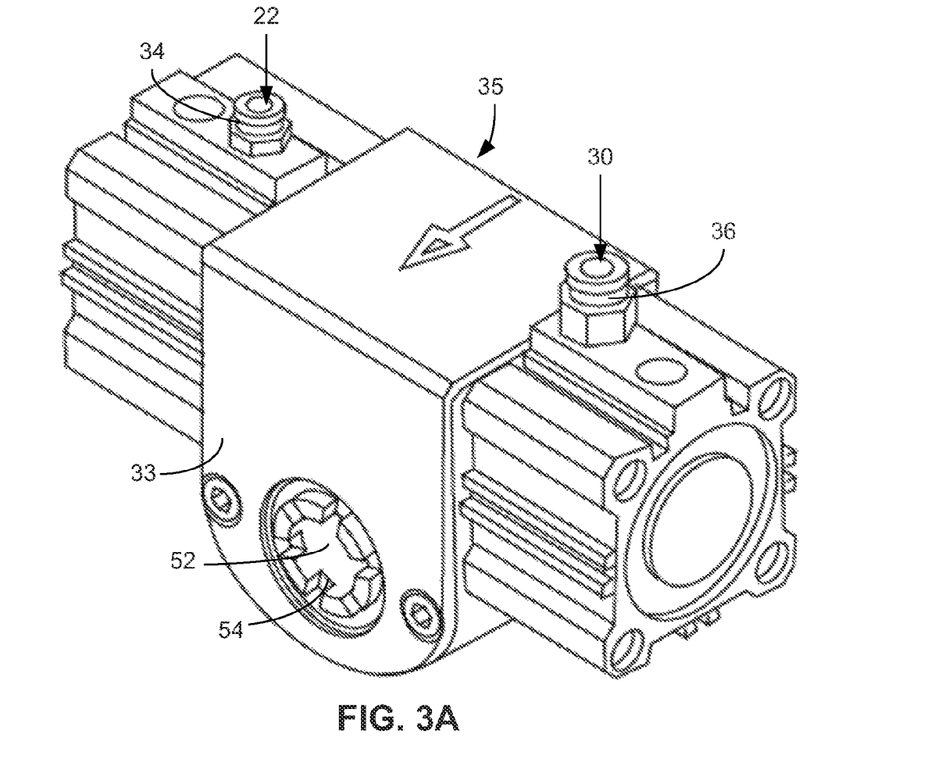
FIG. 3A illustrates a perspective view of a feed box in accordance with various embodiments.
Figure 3B:
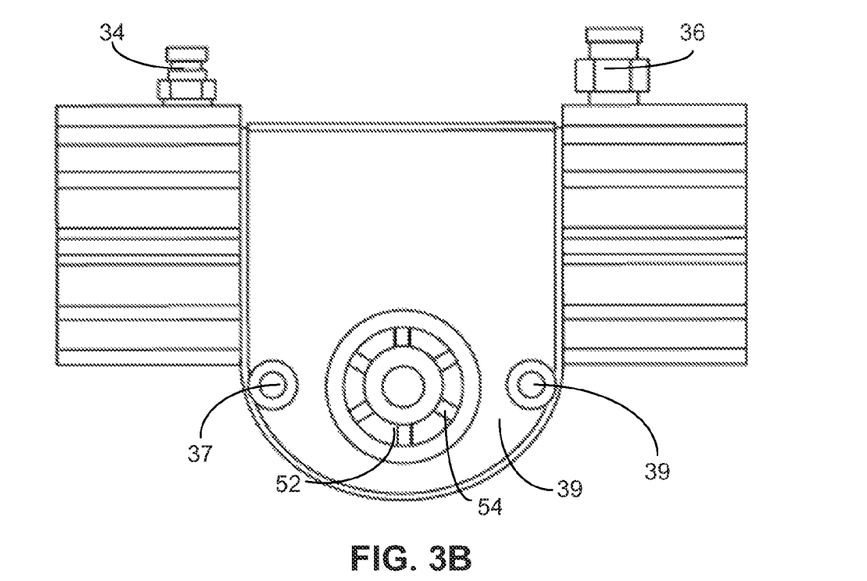
FIG. 3B illustrates a front view of a feed box in accordance with various embodiments.
Figure 3C:
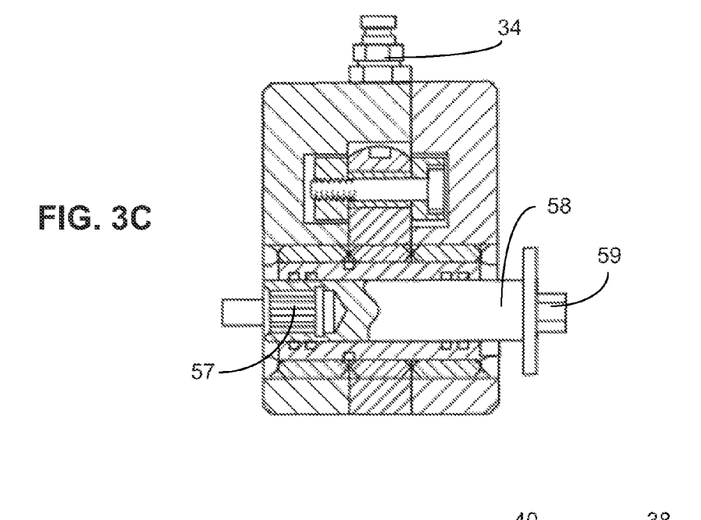
FIG. 3C illustrates a side cross sectional view of a feed box in accordance with various embodiments.
Figure 3D:
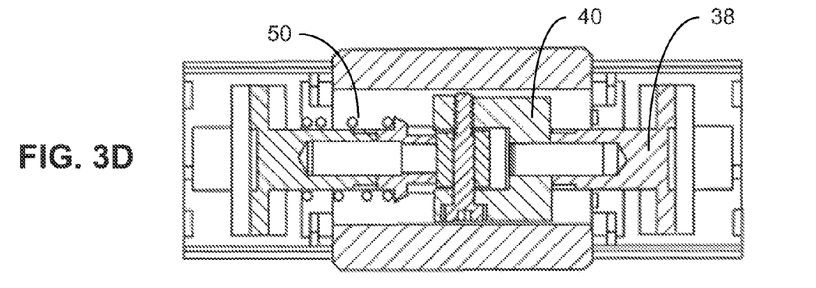
FIG. 3D illustrates a front cross sectional view of a feed box in accordance with various embodiments.
Figure 3E:
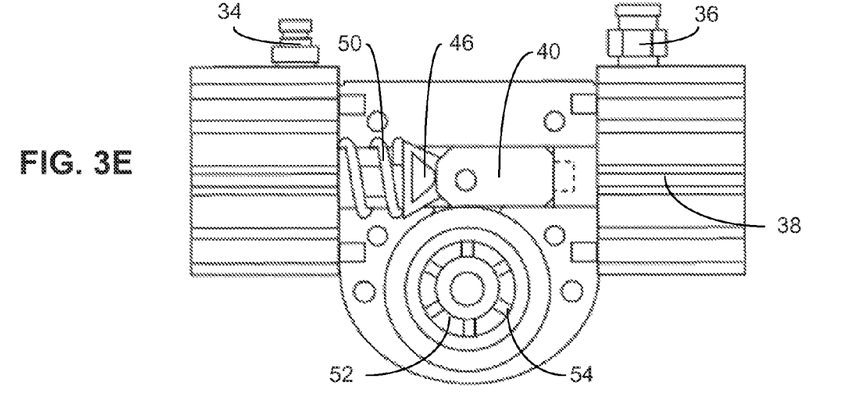
FIG. 3E illustrates a front view showing interior components of a feed box in accordance with various embodiments.
Figure 3F:
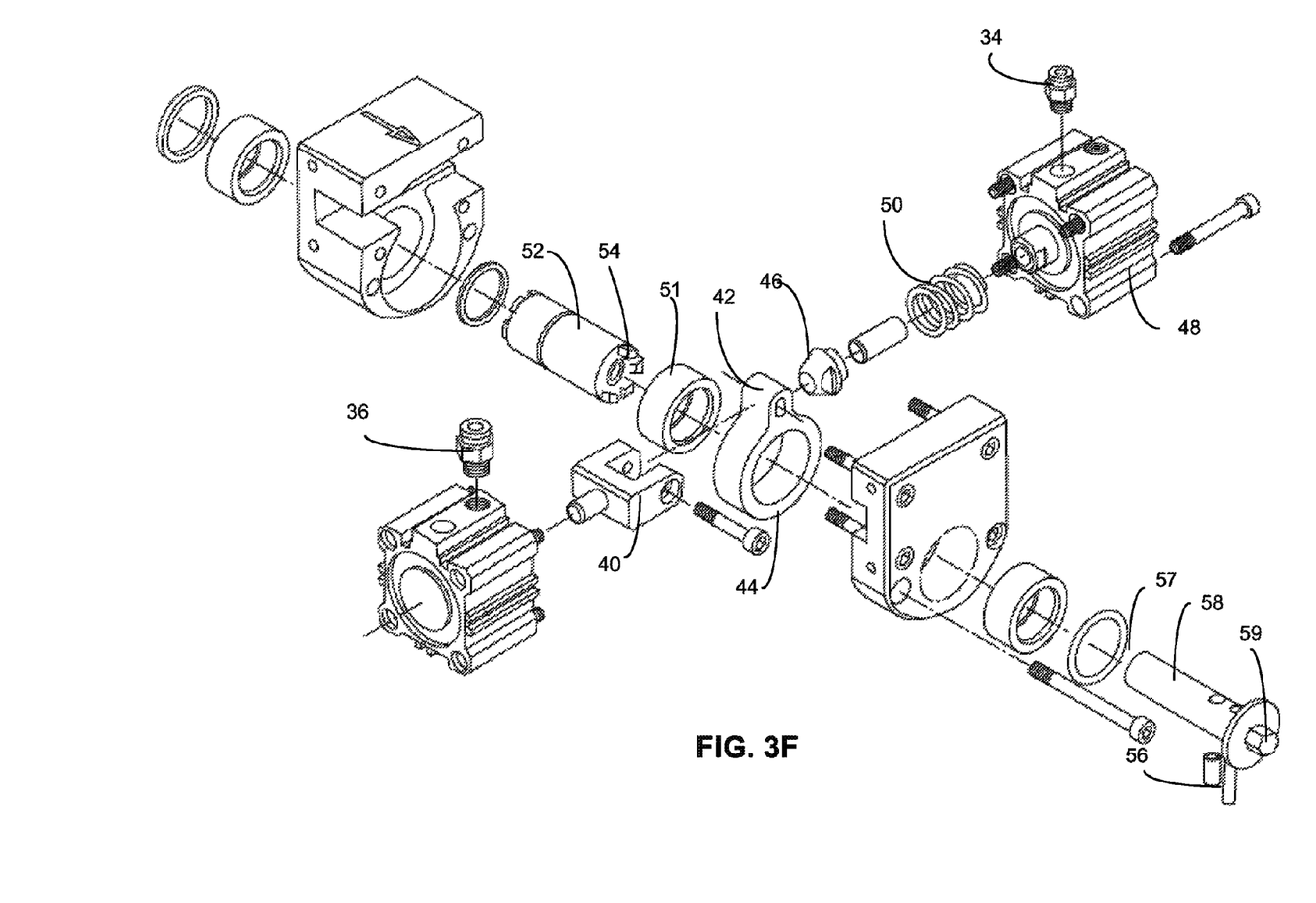
FIG. 3F illustrates an exploded view of a feed box in accordance with various embodiments.

In some embodiments, the unregulated air supply 20 and regulated air supply 22 may flow into a rotary union 24, as illustrated in FIG. 2. Regulated air supply 22 may be passed on to the feed box (shown in FIGS. 3A-F). As shown in FIG. 2, unregulated air supply 20 may be sent through a trip valve 27 actuated by a trip feed cam 29. As the rotating portion 28 of rotary union 24 rotates, the trip valve 27 and trip feed cam 29 create a pulsed air supply 30 from unregulated air supply 20. Since the trip feed cam 29 remains stationary while the rotating portion 28 of rotary union 24 rotates, pulsed air supply 30 will have as many pulses of air per rotation of the rotating portion 28 of rotary union 24 as there are notches in trip feed cam 29.

Rotary union 24 may be used in machining tools with a rotating tool arm, such as a flange facer, in order for the external hoses carrying unregulated air supply 20 and regulated air supply 22 to remain stationary while the tool arm rotates. In such embodiments, rotary union 24 may include a stationary portion coupled to a stationary mount of the machining tool and a rotating portion that rotates with the tool arm. However, in other embodiments, the remotely adjustable feed system may be used in a machining tool that does not have a rotating tool arm, and the rotating elements of the rotary union 24 may be unnecessary. In such embodiments, the pulsed air supply 30 may be created by other suitable means.

Figure 6:
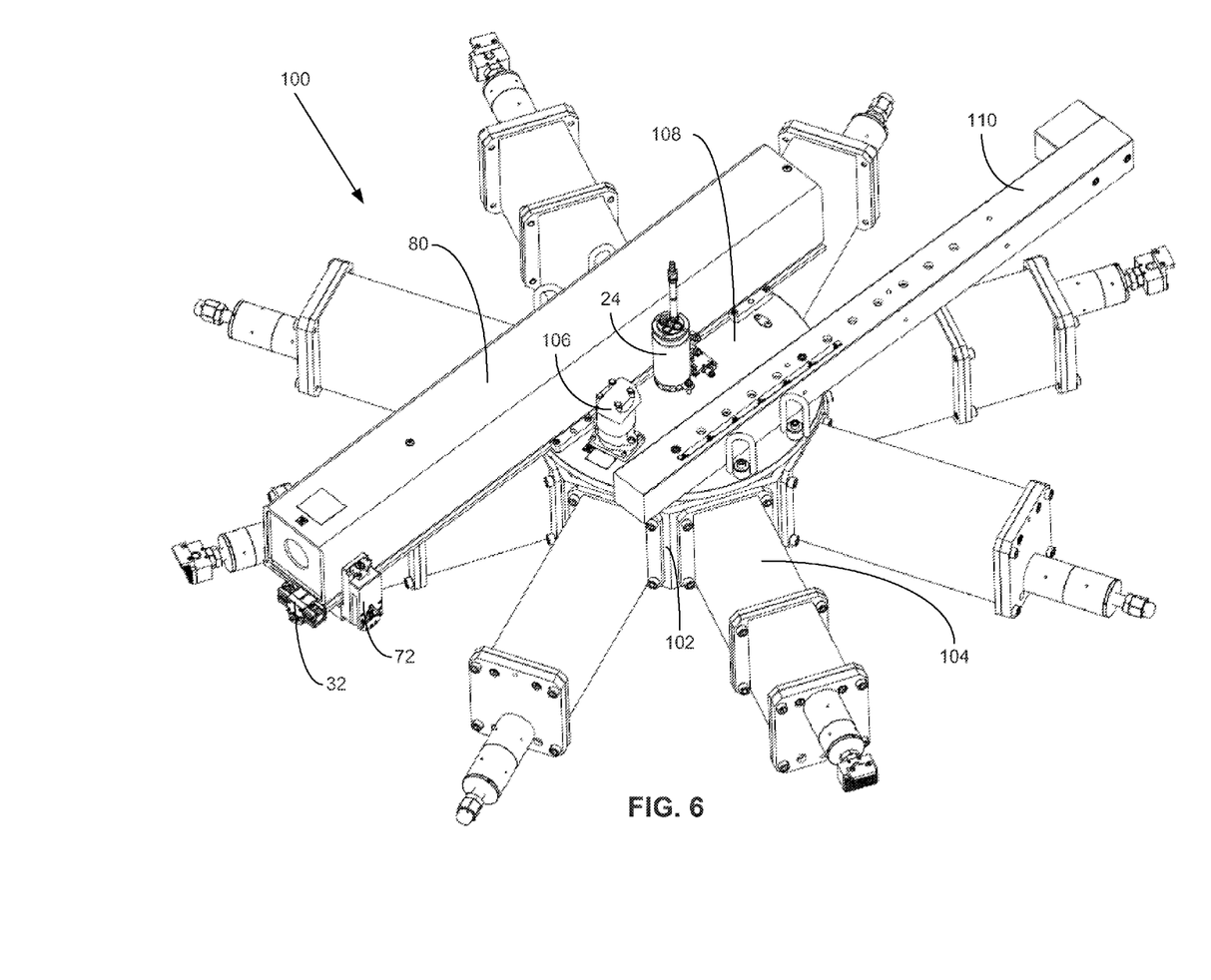
FIG. 6 illustrates a perspective view of a flange facer employing a remotely adjustable feed system in accordance with various embodiments.

From rotary union 24, regulated air supply 22 and pulsed air supply 30 may be sent to the feed box 32 as illustrated in FIGS. 3A-F. Feed box 32 may include a front face 33 and a rear face 35. Feed box 32 may further include mounting holes 37 and 39 extending all the way through feed box 32 for mounting feed box 32 to a mounting position on the machining tool (an example of which is shown in FIG. 6). Feed box 32 may be mounted with the rear face 35 facing the mounting position or the front face 33 facing the mounting position. Changing the orientation of how the feed box 32 is mounted may change the direction of the feed, as explained below.

Regulated air supply 22 may be coupled to input port 34, and pulsed air supply 30 may be coupled to input port 36. The bursts of air in pulsed air supply 30 cause actuating cylinder 38 to stroke back and forth along a linear path. Actuating cylinder 38 may be coupled to a clevis 40 that is coupled to the tang 42 of a ratchet arm 44 by a pin 46, allowing ratchet arm 44 to hinge as actuating cylinder 38 strokes. However, when regulated air supply 22 is off, i.e., not providing air pressure, actuating cylinder 38 is prevented from stroking by retainer 47 on the end of spring loaded piston 48. Spring loaded piston 48 may include a spring 50. Regulated air supply 22 may provide input on the shaft side of piston 48, such that as the pressure in regulated air supply 22 is increased, the pressure overcomes the force of spring 50 and causes piston 48 to retract. This allows actuating cylinder 38 to stroke further, which causes ratchet arm 44 to hinge further. Ratchet arm 44 is coupled to clutch bearing 51 and causes clutch bearing 51 to rotate bushing 52 in one direction as ratchet arm 44 is hinged back and forth. Bushing 52 may have notches 54 at each end to engage a pin 56 extending radially from a feed shaft 58, such that when feed shaft 58 is in place, feed shaft 58 rotates as bushing 52 rotates. In some embodiments, feed shaft 58 may include a plurality of pins to engage the notches 54 of bushing 52. Feed shaft 58 may include a female hex connection on a female hex end 57 and a male hex connection on a male hex end 59. The female hex end 57 of feed shaft 58 may engage a lead screw, as explained more fully below, which causes a tool head coupled to the lead screw to feed, e.g., move, along an axis of motion. The male hex connection on the male hex end 59 of feed shaft 58 may be used for manually adjusting the feed, as explained below.

In this configuration, the frequency with which actuating cylinder 38 will stroke remains constant, but the distance actuating cylinder is able to travel with each stroke increases as the pressure in regulated air supply 22 is increased. As such, the feed rate of the tool head may be adjusted by turning regulator 14 which increases the pressure in regulated air supply 22. Because regulated air supply 22 is input on the shaft side of spring loaded piston 48, there will be no feed of the tool head when regulated air supply 22 is turned off. This increases the safety of the system since the feed will shut off in the event that pressure is lost.

Similarly, in some embodiments, actuating cylinder 38 may be spring loaded, and pulsed air supply 30 may be input on the shaft side of actuating cylinder 38. In these embodiments, the bursts of air from pulsed air supply 30 cause the actuating cylinder 38 to retract, and the spring drives the actuating cylinder 38 forward between bursts. Since there may be some variation in air pressure in the pulsed air supply 30, inputting pulsed air supply 30 on the shaft side of actuating cylinder 38 may provide a more consistent stroke of actuating cylinder 38.

Figures 4A, 4B:
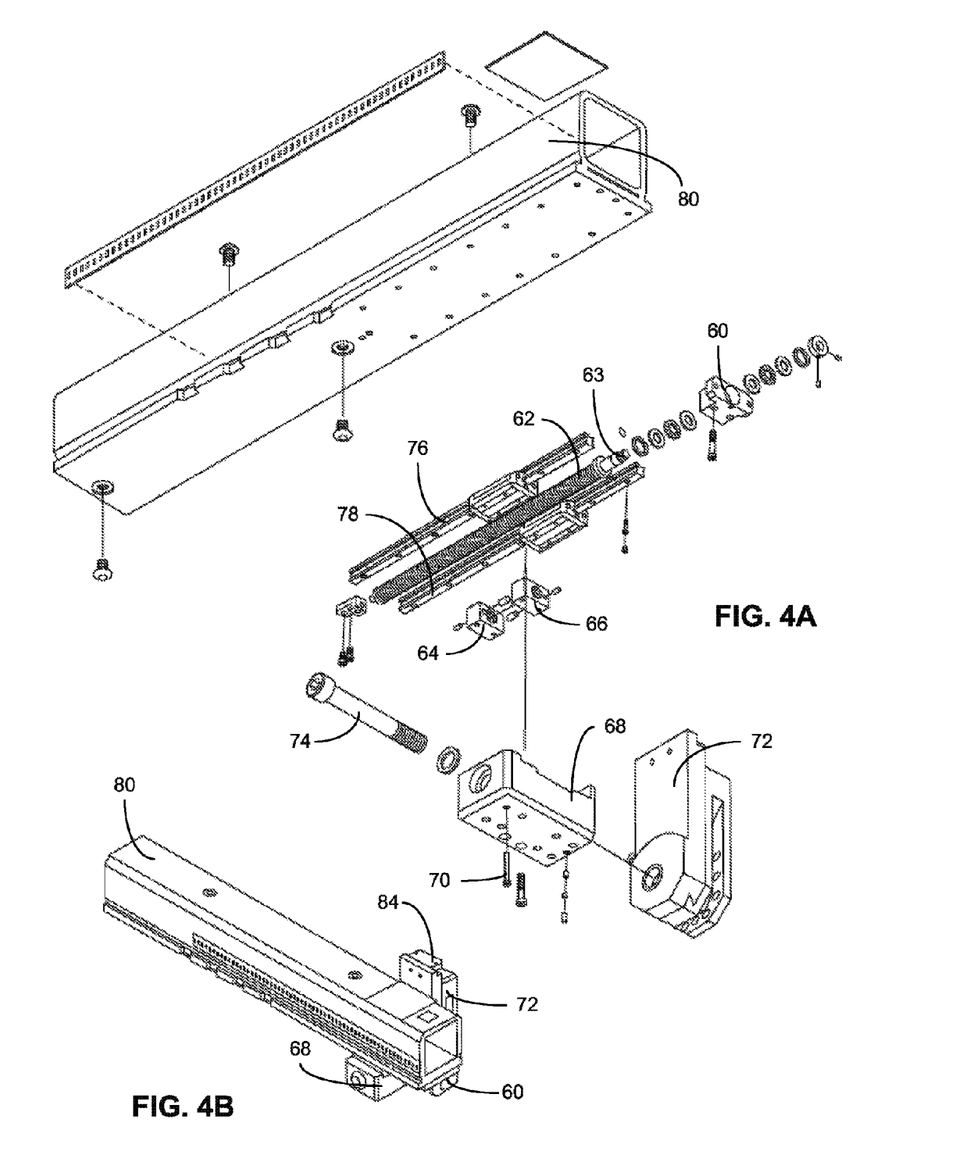
FIG. 4A illustrates an exploded view of a tool arm in accordance with various embodiments.
FIG. 4B illustrates a perspective view of a tool arm in accordance with various embodiments.

Referring now to FIGS. 4A-B, the feed box 32 may be mounted to bearing block 60, which is coupled to lead screw 62. When feed box 32 is mounted to bearing block 60, feed shaft 58 may be inserted in bushing 52 such that the female hex end 57 of feed shaft 58 engages a male hex end 63 of lead screw 62. Lead screw 62 is threaded through lead screw nuts 64 and 66. Threading lead screw 62 through two nuts rather than one may prevent backlash between the nuts and lead screw 62, but in some embodiments, lead screw 62 may be threaded through only one nut. Lead screw nuts 64 and 66 are coupled to tool head mount 68 by screws 70, and tool head 72 may be coupled to tool head mount 68 by bolt 74. Tool head mount 68 may be movably coupled to linear rails 76 and 78 such that linear rails 76 and 78 support the load of tool head 72, and tool head mount 68 may slide linearly along the length of linear rails 76 and 78 as lead screw 62 turns and pushes lead screw nuts 64 and 66. The linear rails 76 and 78 may have a bearing surface to facilitate the sliding of tool head mount 68 on linear rails 76 and 78. Linear rails 76 and 78 are mounted to tool arm 80. As the lead screw 62 is rotated by the female hex end of feed shaft 58, as explained above, lead screw nuts 64 and 66 travel down lead screw 62 and cause tool head mount 68 and tool head 72 to slide down linear rails 76 and 78. Accordingly, tool head 72 moves linearly down tool arm 80.

Referring now to FIGS. 1A-4B, when feed shaft 58 is inserted into bushing 52 such that pin 56 of feed shaft 58 engages the notches 54 of bushing 52 and the female hex end 57 of feed shaft 58 engages the male hex end 63 of lead screw 62, the motion of tool head 72 down tool arm 80 may turned on, and the rate of motion may be increased, by turning regulator 14 to increase the pressure in regulated air supply 22. Similarly, the rate of motion of tool head 72 down tool arm 80 may be decreased, or the movement may be turned off, by turning regulator 14 the other way to decrease the pressure in regulated air supply 22.

The embodiment of the feed box 32 illustrated in FIGS. 3A-F is designed to allow remote adjustment of the feed in only one direction at a time. That is, the feed box 32 is designed to rotate bushing 52 in one direction. This simplifies the design, because it does not require a mechanism for doing both forward and reverse movement, such as a transmission. However, feed box 32 may be used to remotely control the movement of tool head 72 in the opposite direction by removing feed shaft 58 and de-mounting feed box 32, then reversing feed box 32 and mounting the opposite face of feed box 32 to bearing block 60 and re-inserting feed shaft 58. In this configuration, feed shaft 58 will rotate the lead screw 62 in the opposite direction, causing tool head 72 to also move in the opposite direction. For example, when feed box 32 is mounted to bearing block 60 with the rear face 35 facing bearing block 60, the feed may move the tool head 72 forward on the tool arm 80, e.g., away from feed box 32. When feed box 32 is mounted to bearing block 60 with the front face 33 facing bearing block 60, the feed may move the tool head 72 in the reverse direction, e.g., toward feed box 32.

Additionally, the tool head 72 may be moved manually in both forward and reverse directions when the feed box 32 is mounted in either orientation. Feed shaft 58 may be inserted in bushing 52 far enough that the female hex end of feed shaft 58 engages the male hex end 63 of lead screw 62, but without engaging pin 56 with the notches 54 of bushing 52. The lead screw can then be turned manually by turning the male end of feed shaft 58 in either direction. This can be used for fine adjustment of the tool head and/or for adjusting the tool head in the reverse direction without de-mounting and remounting the feed box 32.

Figure 5A:
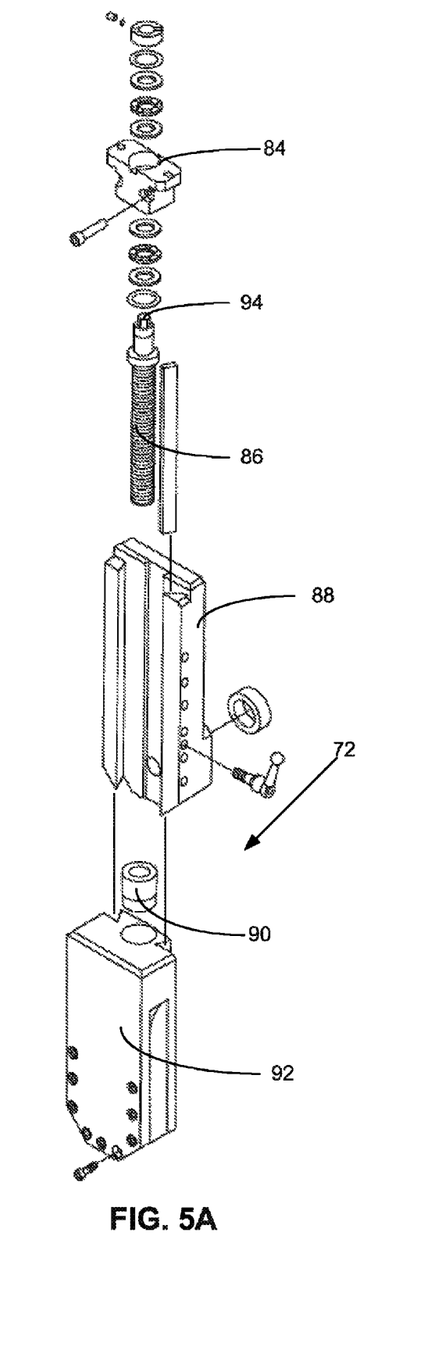
FIG. 5A illustrates an exploded view of a tool head in accordance with various embodiments.
Figure 5B:
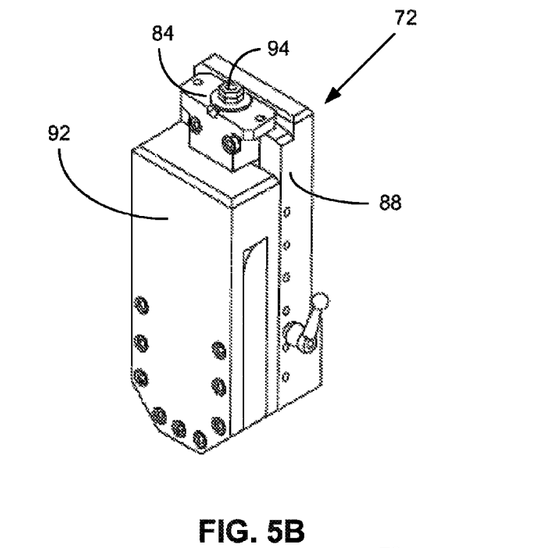
FIG. 5B illustrates a perspective view of a tool head in accordance with various embodiments.
Figure 5C:
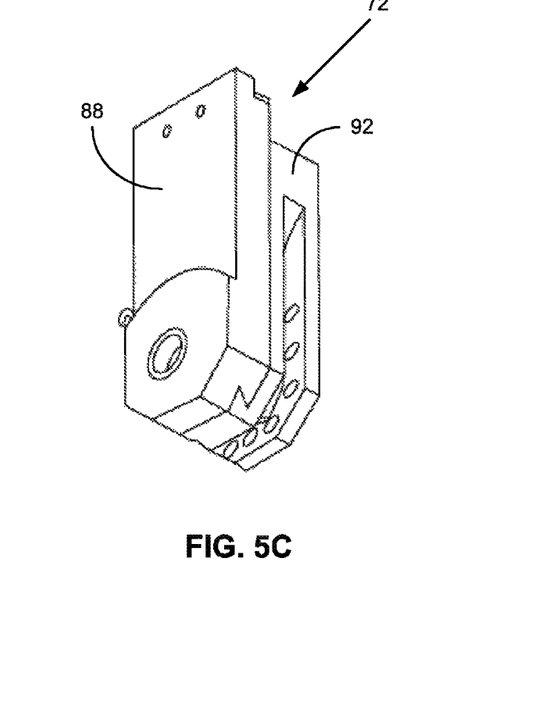
FIG. 5C illustrates a perspective view of a tool head in accordance with various embodiments.

As explained above, mounting the feed box to the bearing block 60 on lead screw 62 allows for remotely adjusting the feed of the tool head 72 along a first axis of motion that is parallel to the axis of the lead screw 62. In some embodiments, the tool head 72 may include a second mounting position 84 to which the feed box 32 may be mounted for remotely adjusting the feed of the tool head 72 in a second axis of motion. Referring now to FIGS. 5A-C, tool head assembly 72 may include a bearing block 84 coupled to a tool head lead screw 86 and tool head base 88. Lead screw 86 may be coupled to tool head lead nut 90 which is coupled to a tool head top slide 92. Tool head top slide 92 may be movably coupled to tool head base 88 by a dovetail joint. When feed box 32 is mounted to bearing block 84, feed shaft 58 may be inserted in bushing 52 to engage the notches 54 of bushing 52 and the male hex end 94 of lead screw 86. As pressure is increased in regulated air supply 22, lead screw 86 is turned, which moves tool head top slide 92 relative to tool head base 88. In this manner, the machining piece of tool head assembly 72 may be moved in a second axis of movement.

As discussed above, tool head assembly 72 may be mounted to tool arm 80 by the bolt 74 coupling tool head 72 to tool head mount 68. The orientation of tool head 72 with respect to the tool arm 80 may be adjusted 360 degrees prior to tightening bolt 74. As such, the user may adjust the second axis of movement to have any orientation with respect to the tool arm 80 in the plane perpendicular to bolt 74.

FIG. 6 shows a perspective view of an example of a machining tool utilizing a remotely adjustable feed system to machine a workpiece, in accordance with various embodiments. Flange facer 100 may include mount hub 102 and mount legs 104 adapted to mount, i.e., chuck, flange facer 100 to a workpiece. Flange facer 100 may further include main body portion 108, adapted to rotate with respect to mount hub 102. Rotary union may be mounted to mount hub 102 and may include a drive motor 106 for driving the rotation of main body portion 108. Tool arm 80 and counterweight 110 may be coupled to main body portion 108 such that tool arm 80 and counterweight 110 will rotate with main body portion 108. Tool arm 80 may include a lead screw (not pictured) and two linear guide rails (not pictured) coupled to the underside of tool arm 80. Tool head mount 68 may be adapted to slide linearly along the linear guide rails and may be coupled to the lead screw by one or more nuts. The lead screw may include a male hex end and may be coupled to a bearing block 60 adapted to receive feed box 32. The remotely adjustable feed system mounted to flange facer 100 may further include a remote controller with air supply lines running from the remote controller to the rotary union 24 to carry the unregulated air supply and the regulated air supply from the remote controller. The remotely adjustable feed system will also include air supply lines running from rotary union 24 to feed box 32 that will rotate with tool arm 80. Rotary union 24 passes the regulated air supply to feed box 32 and converts the unregulated air supply into the pulsed air supply before passing the pulsed air supply to feed box 32.

When the rear face 35 of feed box 32 is mounted to bearing block 60, as depicted in FIG. 6, feed shaft 58 may be inserted to engage the male hex end of the lead screw and the feed of the tool head 72 in a first direction along the axis of the lead screw may be controlled by the remote controller. Similarly, the front face 33 of feed box 32 may mounted to bearing block 60 to remotely control the feed of the tool head 72 in a second direction, opposite to the first direction, along the axis of the lead screw. Furthermore, feed box 32 may be mounted to bearing block 84 on tool head 72 in order to remotely control the feed of tool head 72 in a second axis of motion, as described above.

While the embodiments illustrated in FIGS. 1A-6 describe a pneumatically controlled system, it will be apparent to those of ordinary skill in the art that other systems of control may be utilized. In other embodiments, the remotely adjustable feed system may be controlled by other means, such as hydraulically, electronically, or any combination of pneumatic, hydraulic, and/or electronic based controls. For example, the amount and/or rate of linear motion of the actuator may be controlled by any suitable means, such as pneumatically, hydraulically, electronically, or any combination of pneumatic, hydraulic and/or electronic based controls. Furthermore, the remote controller may operate wirelessly, or may be wired or otherwise physically connected to the actuator. In some embodiments, the remote controller may control the amount and/or rate of linear motion of the actuator directly. In these embodiments, a stop opposite the actuator may not be necessary. In other embodiments, the remote controller may control the amount and/or rate of linear motion of the actuator by controlling the position of the stop opposite the actuator. In yet other embodiments, the rotation of the lead screw may be controlled directly through a motor coupled to the lead screw.

In some embodiments, the remotely adjustable feed system may operate hydraulically. Embodiments using hydraulic controls may be substantially similar to the embodiments described above for pneumatic controls, but may use hydraulic controls instead of pneumatic controls.

In other embodiments, the remotely adjustable feed system may include electronic controls. In some such embodiments, the actuator may be driven by an on-board battery and servo motor. In other embodiments, the actuator may be driven by a slip ring and a motor with one or more solenoids. In electronic based embodiments of the remotely adjustable feed system, the remote controller may directly control the frequency with which the actuator strokes and/or the distance the actuator travels with each stroke. As such, in these embodiments, a stop may not be required to control the movement of the actuator.

In further embodiments, the remotely adjustable feed system may include a combination of pneumatic, hydraulic, electronic, and/or other suitable means of control.

Figure 7:
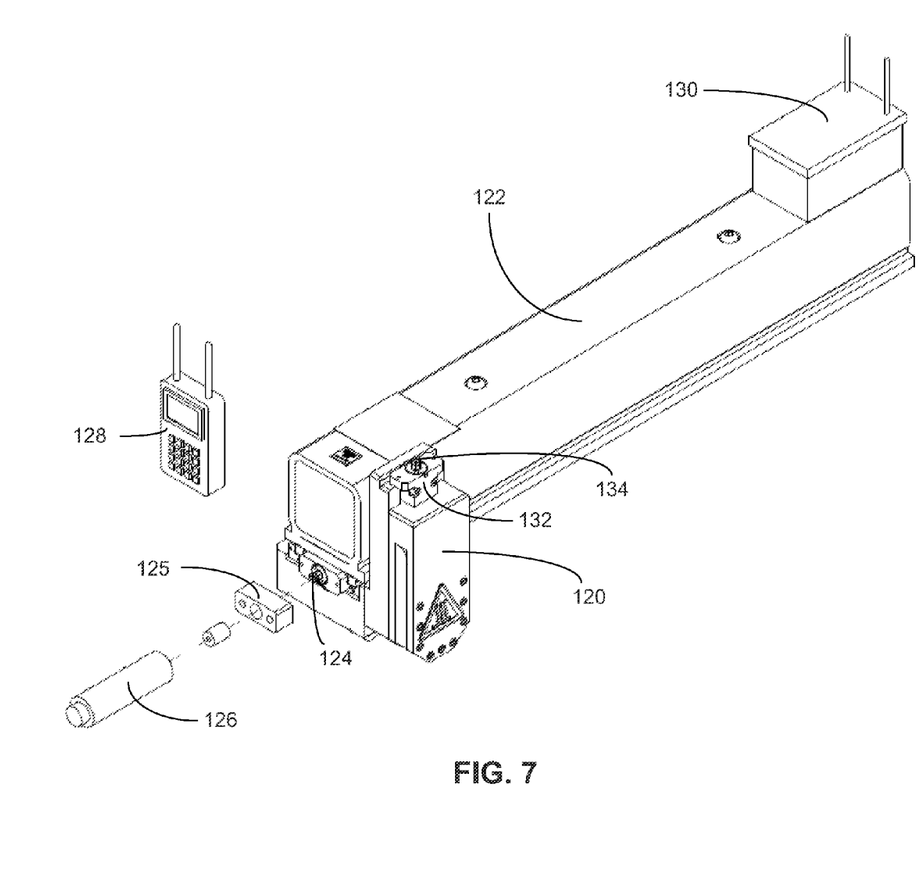
FIG. 7 illustrates a perspective view of a tool arm employing a remote wirelessly adjustable feed system in accordance with various embodiments.

Referring now to FIG. 7, illustrating an alternative embodiment, the motion of a tool head 120 along a tool arm 122 may be controlled by directly controlling the rotation of a lead screw 124. Motor 126 may be coupled to the hex end of lead screw 124 via mounting block 125 such that as motor 126 turns, it rotates lead screw 124. Remote controller 128 may transmit a signal to receiver 130. Receiver 130 may include a battery and controls necessary to cause motor 126 to rotate. In some embodiments, the motor 126 may be configured to rotate continuously. In these embodiments, the remote controller 128 may send a signal to receiver 130 to adjust the speed that motor 126 rotates, thereby adjusting the speed with which tool head 120 moves along tool arm 122. In other embodiments, the motor 126 may be configured to pulse a specified distance and speed with each pulse. In these embodiments, the remote controller 128 may send a signal to receiver 130 to adjust the frequency with which motor 126 rotates, thereby adjusting the speed with which tool head 120 moves along tool arm 122.

Motor 126 may also be mounted to mounting block 132 on tool head 120 and coupled to the male hex end of tool head lead screw 134. In this configuration, the remote controller may be used to control the feed of the tool head in a second axis of motion.

In some embodiments, the remotely adjustable feed system may include a second motor (not shown) coupled to mounting block 132 on tool head 120 such that the remote controller can control the movement of the tool head in the first axis of motion and the second axis of motion without changing the location of the motor 126.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A remotely adjustable feed system comprising:
an actuator adapted for linear back and forth motion along a path, wherein the actuator includes a first spring-loaded piston;
a ratchet clutch coupled to the actuator;
a lead screw adapted to be coupled to the ratchet clutch;
a tool head coupled to the lead screw;
a remote controller adapted to control at least one of a stroke frequency and a stroke distance of linear back and forth motion of the actuator;
a stop including a second spring-loaded piston;
a pulsed air supply, having an on position and an off position, the pulsed air supply coupled to the actuator such that the first spring-loaded piston retracts when the pulsed air supply pulses and the first spring-loaded piston will spring forward in between pulses; and
a regulated air supply, adapted to provide a regulated air pressure within a range of air pressures, the regulated air supply coupled to the stop such that the second spring-loaded piston retracts as the regulated air pressure increases;
wherein the remote controller is adapted to control a magnitude of the regulated air pressure provided by the regulated air supply to control the position of the stop; and
wherein the linear back and forth motion of the actuator causes the ratchet clutch to rotate the lead screw and the rotation of the lead screw causes linear motion of the tool head in a first axis of motion parallel to an axis of the lead screw.

2. The remotely adjustable feed system of claim 1, wherein the remote controller is adapted to control the stroke distance of the actuator.

3. The remotely adjustable feed system of claim 2 further comprising an adjustable stop located in the path of the actuator, wherein the remote controller is adapted to control the stroke distance of the actuator by adjusting the position of the adjustable stop in the path of the actuator.

4. The remotely adjustable feed system of claim 1, wherein the remote controller is adapted to control the stroke frequency of the actuator.

5. The remotely adjustable feed system of claim 1, wherein the remote controller is further adapted to turn the pulsed air supply from the off position to the on position and from the on position to the off position.

6. The remotely adjustable feed system of claim 1, wherein the at least one of the stroke frequency and the stroke distance of linear back and forth motion of the actuator is controlled electronically.

7. The remotely adjustable feed system of claim 6, wherein the remote controller is adapted to control the at least one of the stroke frequency and the stroke distance of linear back and forth motion of the actuator wirelessly.

8. The remotely adjustable feed system of claim 1, wherein the at least one of the stroke frequency and the stroke distance of linear back and forth motion of the actuator is controlled hydraulically.

9. The remotely adjustable feed system of claim 1, wherein the actuator and the ratchet clutch comprise a feed box, and the lead screw is coupled to a mounting block configured to receive the feed box.

10. The remotely adjustable feed system of claim 9, wherein the feed box is adapted to be mounted in a first mounting position on the mounting block for controlling movement of the tool head in a first direction along the first axis of motion, and the feed box is adapted to be mounted in a second mounting position on the mounting block for controlling movement of the tool head in a second direction along the first axis of motion, the second direction being opposite the first direction.

11. The remotely adjustable feed system of claim 10, wherein the feed box further comprises a removable feed shaft adapted to be coupled to the lead screw in a fully inserted position such that the ratchet clutch will engage the removable feed shaft and the removable feed shaft will engage the lead screw.

12. The remotely adjustable feed system of claim 11, wherein the removable feed shaft is adapted to be coupled to the lead screw in a partially inserted position such that the removable feed shaft will engage the lead screw and the ratchet clutch will not engage the removable feed shaft.

13. The remotely adjustable feed system of claim 9 wherein the mounting block comprises a first mounting block and further comprising:
- a second mounting block coupled to the tool head and configured to receive the feed box;
- a tool head lead screw coupled to the second mounting block, such that the linear back and forth motion of the actuator causes the ratchet clutch to rotate the tool head lead screw; and
- a machining head coupled to the tool head lead screw, such that the rotation of the tool head lead screw causes the machining head to move in a second axis of motion.

14. A remotely adjustable feed system comprising:
- an actuator adapted for linear back and forth motion along a path;
- a ratchet clutch coupled to the actuator;
- a lead screw adapted to be coupled to the ratchet clutch;
- a tool head coupled to the lead screw;
- a remote controller adapted to control at least one of a stroke frequency and a stroke distance of linear back and forth motion of the actuator;
- wherein the linear back and forth motion of the actuator causes the ratchet clutch to rotate the lead screw and the rotation of the lead screw causes linear motion of the tool head in a first axis of motion parallel to an axis of the lead screw;
- wherein the actuator and the ratchet clutch comprise a feed box, and the lead screw is coupled to a mounting block configured to receive the feed box; and
- wherein the feed box is adapted to be mounted in a first mounting position on the mounting block for controlling movement of the tool head in a first direction along the first axis of motion, and the feed box is adapted to be mounted in a second mounting position on the mounting block for controlling movement of the tool head in a second direction along the first axis of motion, the second direction being opposite the first direction.

15. The remotely adjustable feed system of claim 14, wherein the feed box further comprises a removable feed shaft adapted to be coupled to the lead screw in a fully inserted position such that the ratchet clutch will engage the removable feed shaft and the removable feed shaft will engage the lead screw.

16. The remotely adjustable feed system of claim 15, wherein the removable feed shaft is adapted to be coupled to the lead screw in a partially inserted position such that the removable feed shaft will engage the lead screw and the ratchet clutch will not engage the removable feed shaft.

17. The remotely adjustable feed system of claim 14, wherein the remote controller is adapted to control the stroke distance of the actuator.

18. The remotely adjustable feed system of claim 17, further comprising an adjustable stop located in the path of the actuator, wherein the remote controller is adapted to control the stroke distance of the actuator by adjusting the position of the adjustable stop in the path of the actuator.

19. The remotely adjustable feed system of claim 14, wherein the remote controller is adapted to control the stroke frequency of the actuator.

20. The remotely adjustable feed system of claim 14, wherein the at least one of the stroke frequency and the stroke distance of linear back and forth motion of the actuator is controlled hydraulically.

21. A remotely adjustable feed system comprising:
- an actuator adapted for linear back and forth motion along a path;
- a ratchet clutch coupled to the actuator;
- a lead screw adapted to be coupled to the ratchet clutch;
- a tool head coupled to the lead screw;
- a remote controller adapted to control at least one of a stroke frequency and a stroke distance of linear back and forth motion of the actuator;
- wherein the linear back and forth motion of the actuator causes the ratchet clutch to rotate the lead screw and the rotation of the lead screw causes linear motion of the tool head in a first axis of motion parallel to an axis of the lead screw;
- wherein the actuator and the ratchet clutch comprise a feed box, and the lead screw is coupled to a mounting block configured to receive the feed box, wherein the mounting block comprises a first mounting block and further comprising:
  - a second mounting block coupled to the tool head and configured to receive the feed box;
  - a tool head lead screw coupled to the second mounting block, such that the linear back and forth motion of the actuator causes the ratchet clutch to rotate the tool head lead screw; and
  - a machining head coupled to the tool head lead screw, such that the rotation of the tool head lead screw causes the machining head to move in a second axis of motion.

22. The remotely adjustable feed system of claim 21, wherein the feed box is adapted to be mounted in a first mounting position on the mounting block for controlling movement of the tool head in a first direction along the first axis of motion, and the feed box is adapted to be mounted in a second mounting position on the mounting block for controlling movement of the tool head in a second direction along the first axis of motion, the second direction being opposite the first direction.

23. The remotely adjustable feed system of claim 22, wherein the feed box further comprises a removable feed shaft adapted to be coupled to the lead screw in a fully inserted position such that the ratchet clutch will engage the removable feed shaft and the removable feed shaft will engage the lead screw.

24. The remotely adjustable feed system of claim 23, wherein the removable feed shaft is adapted to be coupled to the lead screw in a partially inserted position such that the removable feed shaft will engage the lead screw and the ratchet clutch will not engage the removable feed shaft.

25. The remotely adjustable feed system of claim 21, wherein the remote controller is adapted to control the stroke distance of the actuator.

26. The remotely adjustable feed system of claim 25, further comprising an adjustable stop located in the path of the actuator, wherein the remote controller is adapted to control the stroke distance of the actuator by adjusting the position of the adjustable stop in the path of the actuator.

27. The remotely adjustable feed system of claim 21, wherein the remote controller is adapted to control the stroke frequency of the actuator.

28. The remotely adjustable feed system of claim 21, wherein the at least one of the stroke frequency and the stroke distance of linear back and forth motion of the actuator is controlled hydraulically.

* * * * *